US009727316B2

(12) United States Patent
Datar et al.

(10) Patent No.: US 9,727,316 B2
(45) Date of Patent: Aug. 8, 2017

(54) SYSTEMS AND METHODS FOR SKINNING AN APPLICATION WITH INTERACTIVE CONTENT

(71) Applicant: Google Inc., Mountain View, CA (US)

(72) Inventors: Mayur Datar, Cupertino, CA (US); Allen Huang, Mountain View, CA (US); Siavash Sedigh Nejad, San Francisco, CA (US)

(73) Assignee: Google Inc., Mountain View, CA (US)

( * ) Notice: Subject to any disclaimer, the term of this patent is extended or adjusted under 35 U.S.C. 154(b) by 812 days.

(21) Appl. No.: 13/767,725

(22) Filed: Feb. 14, 2013

(65) Prior Publication Data

US 2014/0229314 A1    Aug. 14, 2014

(51) Int. Cl.
*G06Q 30/06* (2012.01)
*G06F 9/44* (2006.01)
*G06Q 30/08* (2012.01)

(52) U.S. Cl.
CPC ....................... *G06F 8/38* (2013.01)

(58) Field of Classification Search
CPC ............................. G05Q 30/06; G06Q 30/08
USPC ................................. 705/26.1, 27.1
See application file for complete search history.

(56) References Cited

U.S. PATENT DOCUMENTS

2008/0215428 A1    9/2008   Ramer et al.
2009/0125376 A1    5/2009   Sundaresan et al.
2009/0287567 A1*   11/2009  Penberthy et al. ........ 705/14.43
2010/0042911 A1    2/2010   Wormald et al.
2010/0153848 A1    6/2010   Saha
2010/0223142 A1    9/2010   Bosan et al.
2011/0296312 A1    12/2011  Boyer et al.
2012/0185334 A1    7/2012   Sarkar et al.
2012/0246718 A1*   9/2012   Spears et al. ................... 726/21
2012/0254292 A1    10/2012  Newton et al.

(Continued)

FOREIGN PATENT DOCUMENTS

WO    WO-2012/100303    8/2012

OTHER PUBLICATIONS

International Search Report and Written Opinion in Application No. PCT/US2014/015728 dated Nov. 20, 2014.

(Continued)

*Primary Examiner* — James Zurita
(74) *Attorney, Agent, or Firm* — Foley & Lardner LLP; John D. Lanza

(57) ABSTRACT

In one implementation, an electronic package of assets substantially complying with a standard is received from a content provider. Placeholders in an application referring to items of content defined by the standard are replaced with items of content from the package of assets. In another implementation, an electronic package of assets substantially complying with a standard is received from a content provider. A publisher is identified, the package of assets is provided to the publisher, and an application incorporating items from the package of assets is received. In another implementation, a package of assets substantially complying with a standard is prepared, an application is received from a publisher, and a version of the application is generated, replacing references in the application to items defined in a standard with items of content from the package of assets.

13 Claims, 7 Drawing Sheets

(56) References Cited

U.S. PATENT DOCUMENTS

2012/0303517 A1   11/2012  Kang
2014/0068549 A1*  3/2014  Friedman et al. ............ 717/104

OTHER PUBLICATIONS

Creative Acceptance Policy, Universal Video Asset (UVA), Apr. 9, 2012.
International Preliminary Report on Patentability, App. No. PCT/US2014/015728, mailed Aug. 27, 2015, 7 pgs.

* cited by examiner

SYSTEMS AND METHODS FOR SKINNING AN APPLICATION WITH INTERACTIVE CONTENT

BACKGROUND

Currently, when requesting content in an online environment, a single item of content may be replaced into a field in an electronic application and provided for display in response to a request for an item of content. In some situations, a single item of content may be requested and multiple, alternative items of content are received and cached for rotating placement in a field of an electronic application. However, content population for each field in an electronic application requires a new request for content.

SUMMARY

At least one aspect is directed to a method of skinning an application with interactive content. In some implementations, the method can include a server receiving an electronic package of assets from a content provider. The package of assets can substantially comply with a standard. The method can include replacing at least one of a plurality of placeholders in an electronic application with content from the package of assets. The plurality of placeholders can be references to items of content described in the standard. The method can include providing the application at a graphical user interface. The method can include identifying an event of the electronic application. The event can be identified by an interface corresponding to at least one content of the electronic package of assets, or at least one placeholder of the plurality of placeholders. The method can include updating the content associated with the at least one placeholder of the electronic application. The content can be updated responsive to the identification of the event.

At least one aspect is directed to a system of skinning an application with interactive content. In some implementations, the system can include a data processing system. The data processing system can be configured to receive an electronic package of assets from a content provider. The package of assets can substantially complying with a standard. The data processing system can be configured to replace at least one of a plurality of placeholders in an electronic application with content from the package of assets. The plurality of placeholders can be references to items of content described in the standard. The data processing systems can be configured to provide the application at a graphical user interface. The data processing system can be configured to identify an event of the electronic application. The data processing system can be configured to identify the event via an interface corresponding to at least one content of the electronic package of assets and/or at least one placeholder of the plurality of placeholders. The data processing system can update the content associated with the at least one placeholder of the electronic application. The content can be updated responsive to the identification of the event.

At least one aspect is directed to a computer readable storage medium having instructions for skinning an application with interactive content. In some implementations, the instruction can include instructions to receive an electronic package of assets from a content provider. The package of assets can substantially comply with a standard. The instruction can include instructions to replace at least one of a plurality of placeholders in an electronic application with content from the package of assets. The plurality of placeholders can be references to items of content described in the standard. The instruction can include instructions to provide the application at a graphical user interface. The instruction can include instructions to identify an event of the electronic application. The event can be identified via an interface corresponding to at least one content of the electronic package of assets and/or at least one placeholder of the plurality of placeholders. The instruction can include instructions to update the content associated with the at least one placeholder of the electronic application. The content can be updated responsive to the identification of the event.

In some implementations, an electronic package of assets substantially complying with a standard is received from a content provider. Placeholders in an application referring to items of content defined by the standard are replaced with items of content from the package of assets.

In some implementations, an electronic package of assets substantially complying with a standard is received from a content provider. A publisher is identified, the package of assets is provided to the publisher, and an application incorporating items from the package of assets is received.

In some implementations, a package of assets substantially complying with a standard is prepared, and an application is received from a publisher. A version of the application is generated, replacing references in the application to items defined in a standard with items of content from the package of assets.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, drawings, and the claims.

Like reference numbers and designations in the various drawings indicate like elements.

DETAILED DESCRIPTION

Figure 1:
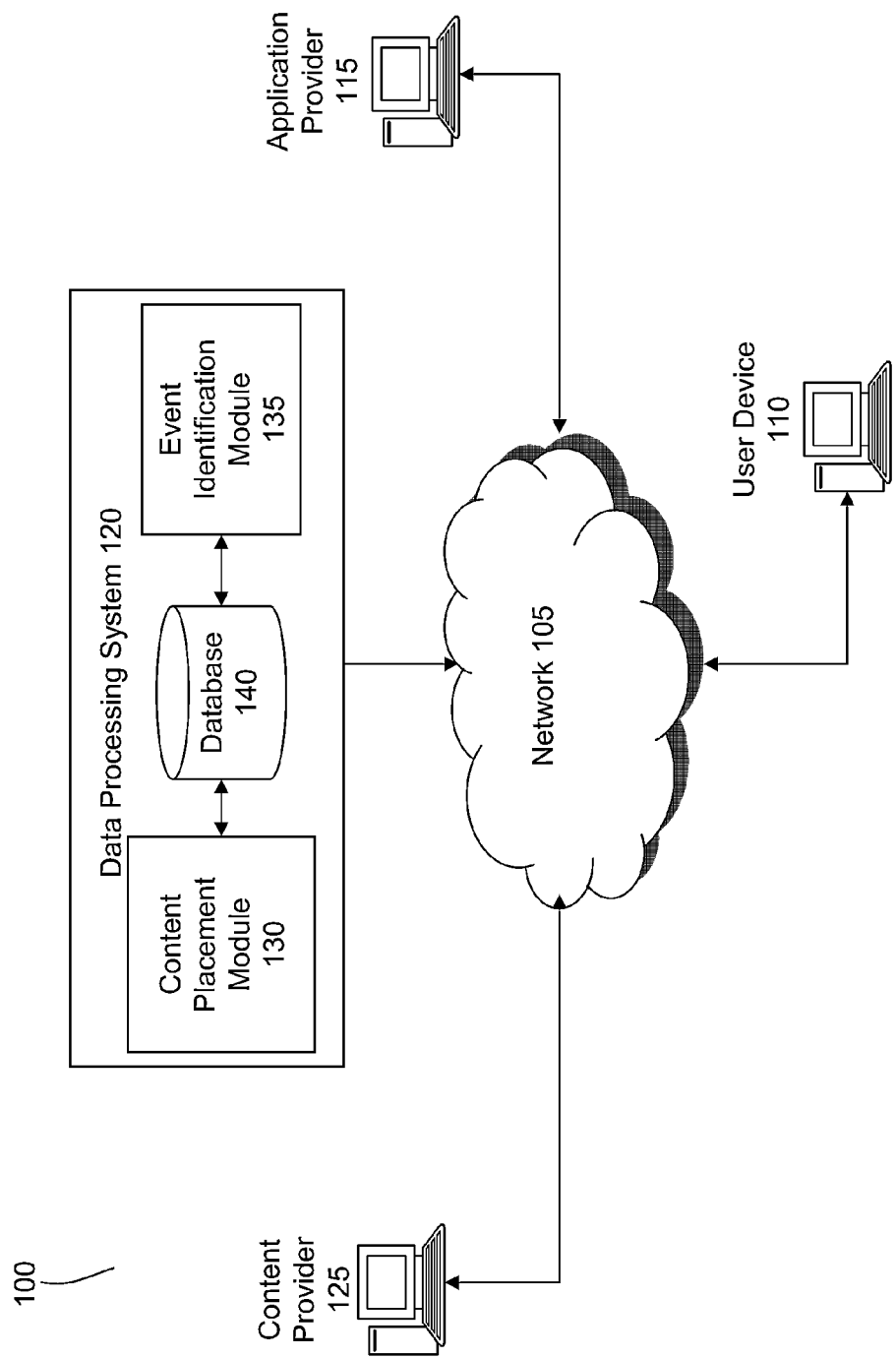
FIG. 1 is an illustration of an example system for skinning an application with interactive content in accordance with an implementation.

The present disclosure is directed generally to systems and methods of skinning (e.g., the process of applying a custom GUI to software) a mobile application with interactive content (e.g., text, images, videos, multimedia, advertisements, hyperlinks, haptic commands). More specifically, systems and methods of the present disclosure facilitate updating the skinned content by a content server without an end user having to re-download the mobile application.

In some implementations, the present disclosure improves the incorporation of an electronic package of assets including content into an application by using predefined standards. For example, instead of an application provider developing individual applications incorporating particular content, systems and methods of the present disclosure allow the application provider to develop one application with placeholders for content conforming to a standard, then replace the placeholders with content items from a standardized package of assets. In some implementations, two or more placeholders may be replaced with content of an electronic package of assets responsive to a single request for content.

Incorporation of a standardized package of assets into an application can be predominantly automated. For example, a standardized package of assets may include software instructions for replacing placeholders in an application with items of content from the package of assets. In other implementations, an application may include software instructions for replacing placeholders in the application with items of content from a package of assets. In yet other implementations, software instructions for replacing placeholders in an application with items of content from a package of assets may be stored in a memory on a computer independent of the application and the package of assets.

By combining content into a standardized package of assets, the content in the package of assets may be cohesive and therefore may become an integral part of an application. The package of assets may include content to be incorporated into the application such that the content appears to be part of the application itself. For example, in a game application, content such as color themes, sounds, or logos may be incorporated on various game characters, backgrounds, maps, or other game objects.

Further to this example, the electronic package of assets may interact with an aspect of the application. For example, an electronic package of assets that includes content may be provided by a content provider to a data processing system. The electronic package of assets can correspond to a standard to facilitate identifying a content item of the electronic package of assets that corresponds to a placeholder of the electronic application (e.g., a game, an educational utility, a drawing utility, an image editing utility, a search utility, a spreadsheet utility, a word processing utility, a calendar utility, a written communication utility, a verbal communication utility, or a network access utility). In some implementations, the electronic package of assets includes an interface corresponding to a placeholder that is configured to identify an event of the electronic application. The standard may define a plurality of events for which the electronic package may include corresponding content. Responsive to identifying an event via the interface, the content may be replaced and/or updated with new content that can be selected based on the event or type of event. In some implementations, standardized events may refer to categories of events such as "good", "bad" or "neutral", a class of events (e.g., A, B, or C), or a spectrum of events. Accordingly, the electronic package of assets may include assets or content items complying with one or more standard by including content items for at least one event type.

In an illustrative example, a mobile application such as a game can include cars racing on a track, content along the side of the track, and a scoreboard. The cars, track, and scoreboard may be skinned with content from the content provider that corresponds to the standard. When a car crashes into content along the side of the race track, this content may be replaced with new content provided by the content provider, e.g., an advertisement for shoes may be replaced with an advertisement for car insurance upon a collision. The content may be further selected based on the type of event, a severity of the event, or other event-related metrics defined by the standard. For example, the application may identify a car crash as a negative or bad event and indicate to the electronic package of assets that a bad event occurred corresponding to the placeholder. The electronic package of assets may then identify a content item that complies with the standards for the placeholder, including the event type, and provide the content item for display via the application.

In some implementations, the data processing system may re-skin the mobile application on a periodic basis. For example, multiple content providers may bid in an online auction to provide content to one or more mobile applications. An application can be skinned with content from a single content provider or skinned with content from multiple content providers. For example, a first content provider may provide content for placeholders corresponding to the race track while a second content provider may provide content corresponding to placeholders for the scoreboard and menu placeholders.

FIG. 1 illustrates an example system 100 for skinning an application with interactive content via a computer network such as network 105. In brief overview, the system 100 can include a data processing system 120 communicatively coupled to a computer network 105. The data processing system 120 can include a content placement module 130 that places content in an application. The data processing system 120 can include an event identification module 135 that identifies an event that occurs, e.g., during the execution of the application. The data processing system can include a database 140 that stores information to facilitate content placement including (e.g., applications, electronic packages of assets, content items, standards, rules or headers). The system 100 can include content providers 125 that provide content that can be displayed on a user device 110 via an application. The system can include an application provider 115 that can, e.g., develop or maintain an application or facilitate providing the application to a user device 110.

In further detail, the network 105 can include computer networks such as the Internet, local, wide, metro, or other area networks, intranets, satellite networks, and other communication networks such as voice or data mobile telephone networks. The network 105 can be used to access information resources such as web pages, web sites, domain names, uniform resource locators, or applications that can be displayed on at least one user device 110, such as a laptop, desktop, tablet, personal digital assistant, smart phone, portable computers, set-top box, or television. User devices 110 may be equipped with or associated with one or more user input devices (e.g., keyboard, mouse, remote control or touch screen) and/or one or more display devices (e.g., television, monitor, CRT, plasma, LCD, LED, or touch screen). For example, via the network 105 a user of the user device 110 can access an application (e.g., mobile application or desktop application) provided by at least one application provider 115. In this example, the user device 100 can access a server of the data processing system 120 or application provider 115 to retrieve an application to be executed on the user device 110. The application executing on the user device 110 can display, via a graphical user interface, information on a display device of the user device 110 or a display device communicatively coupled to the user device 110. The application provider 115 can include an entity that develops the application, publishes the application, or facilitates providing the application to user device 110 or data processing system 120. For example, the application provider 115 can be an entity that maintains an online application store or other interface by which a user of user device 110 can browse and download an application. In some implementations, the data processing system 120 can provide applications to user device 110. For example, user device 115 can develop the application and provide the application to data processing system 120 for dissemination or sale. The user device 110 may request the application from the data processing system 120, and the data processing system 120 may provide, via network 105, the application to the user device 110.

The system 100 can include at least one data processing system 120. The data processing system 120 can include at least one logic device such as a computing device having a processor to communicate via the network 105, for example with the user device 110, the application provider 115, and at least one content provider 125. The data processing system 120 can include at least one server. For example, the data processing system 120 can include a plurality of servers located in at least one data center. In one implementation, the data processing system 120 includes a content placement system having at least one server. The data processing system 120 can also include at least one content placement module 130, at least one event identification module 135 and at least one database 140. The content placement module 130 and at least one event identification module 135 can each include at least one processing unit or other logic device such as programmable logic array engine, or module configured to communicate with the database 140. The content placement module 130 and event identification module 135 can be separate components, a single component, or part of the data processing system 120.

In some implementations, the data processing system 120 receives an electronic package of assets from a content provider 125. The electronic package of assets can be received via network 105 and stored in database 140. In one example, the data processing system 120 can receive the electronic package of assets in response to a request for a package of assets or content. In another example, the data processing system 120 can receive the electronic package of assets in response to a request for an application or a request to update the skin of an application or an item of content associated with the application. The request to update the skin of an application can originate from the application, application provider 115, user of user device 110, the data processing system 120, or be based on a time interval. For example, the data processing system 120 can be configured to update one or more placeholders of the electronic application daily, weekly, monthly, or some other time interval.

The assets of the electronic package of assets can include one or more items of content such as text, characters, symbols, images, audio, video, multimedia, advertisements or other information. In some implementations, a content provider may provide a set of packages that includes multiple packages of assets retrieved from or associated with a content provider 125. A content provider may provide many packages of assets. For example, a content provider may provide different packages of assets for different types of games, different packages of assets corresponding to different standards, different packages of assets for different days or date ranges, and different packages of assets corresponding to different audiences.

A package of assets can include one or more items of content. In some implementations, the package of assets includes two or more items of content. The package of assets can include information to facilitate placing content in an application, selecting content to place in an application or monitor content placement. For example, each package of assets can include a header and one or more items of content, or two or more items of content.

The header of the electronic package of assets can describe an aspect of the package of assets. Descriptive information may include, e.g., an identification of the content provider (e.g., name, alias, or identification number); a format of the package of assets (e.g., complying with a particular standard number or other standard ID); a format of the data (e.g., number of bits in a packet); a first date by which to use the content; a last date on which to use the content; a longevity of the content, indicating the maximum number of days to use the content in an application; an indication of compliance with all optional rules; an indication of how many and which optional rules of the standard are complied with if not all; a selection of theme colors; and an identification of intended audience. Other descriptive information may additionally or alternatively be included in a header of a package of assets.

In some implementations, the package of assets complies with a standard, or one or more rules of the standard. The standards can, for example, facilitate placing content of a package of assets in an electronic application for display on a user device 110. The standards may be defined by a standard-setting organization, a government entity, a public entity, or a private entity, and include mandatory or optional rules regarding formatting of content, required information, data size, etc. For an electronic package of assets to be in compliance with a particular standard, the package must follow all mandatory rules provided in the standard, and may follow any or all optional rules provided in the standard 210.

A rule can describe formatting and/or content for a header section of an asset package, or describe an aspect of an asset to be included in a package. Rules can refer to, e.g., the minimum number of assets in a package; the size and shape of an icon; the opacity of a background screen; the bit depth of pixels; a field to include in a header; or event type. In some implementations, a rule can include sub-rules. For example, a rule may describe the size of a banner, and the associated sub-rule can indicate, e.g., a color range, opacity or border options for the banner.

The electronic package of assets can include two or more items of content. Content can include individual items of content complying with a rule of a standard. In some implementations, the data processing system 120, upon receiving an electronic package of assets, can identify whether the electronic package of assets complies with one or more standard or a set of standards. For example, a standard can include a rule that requires an item of content to be an icon of size 1 inch×1 inch. In one implementation, the data processing system 120 can, e.g., parse, crawl, or scan the header of the electronic package of assets to identify whether the electronic package of assets complies with the standard. In another implementation, the data processing system 120 can, e.g., parse, crawl, or scan the contents of the electronic package of assets to identify whether the electronic package of assets includes an icon, and further determine the size of the icon. If the data processing system 120 determines that the electronic package of assets includes an item of content corresponding to a 1 inch×1 inch icon, the data processing system 120 can indicate that the electronic package of assets complies with at least one rule of the standard. The term 'complying' in this context indicates substantial compliance with a rule. Substantial compliance may optionally be defined. For example, if defined, the definition may be in the set of standards, in a specific standard, or in a rule. Substantial compliance may be inherent. For example, if a rule defines a maximum pixel depth of 16 bits, then substantial compliance is any pixel depth provided in 16-bit format.

In some implementations, the data processing system 120 may receive two electronic package of assets that fail to comply with a standard individually, but can substantially comply with a standard in combination. Upon making this determination, the data processing system 120 can combine the non-complying electronic package of assets to create a combined electronic package of assets that is in compliance with a standard. In some implementations, the content provider 125 may indicate, in metadata or a header associated with their electronic package of assets, whether their content items can be combined with content items provided by a second content provider 125.

In some implementations, an application provider 115 can provide an application with fields or placeholders complying with a standard by, e.g., designing fields into the application complying with the standard. A content provider 125 can also provide content complying with the same standard by designing or modifying a package of assets to comply with the standard. The data processing system 120 can incorporate one or more items of content of the electronic package of assets into the application by identifying a placeholder corresponding to a standard and a content corresponding to the same standard.

Table 1 depicts standards for a package of assets of a specific implementation provided for illustrative purposes only and is not meant to be limiting in any way. Rows in Table 1 may correspond to rules of the standard and columns of Table 1 may correspond to sub-rules.

TABLE 1

Example of a Standard

| Item | Description | Size or quantity | Mandatory or optional | If Optional, Default used when item not provided |
|---|---|---|---|---|
| 1 | Full-page background | | Mandatory | |
| 2 | Loading-page background | | Mandatory | |
| 3 | Full-page interstitial/rich-media experience | | Mandatory | |
| 4 | Light version banner | 320 × 50 | Mandatory | |
| 5 | Dark version banner | 320 × 50 | Optional | Light version banner |
| 6 | Scalable icon - light-colored version | 120 × 120 | Mandatory | |
| 7 | Scalable icon - multi-colored version | 120 × 120 | Optional | Light-colored version |
| 8 | Scalable icon - dark-colored version | 120 × 120 | Optional | Light-colored version |
| 9 | Light color palette | 3 colors | Mandatory | |
| 10 | Dark color palette | 3 colors | Optional | Light color palette |
| 11 | Textures | 4 | Optional | No texture |
| 12 | Scalable icon to be used as button to link to advertiser CTA | 120 × 120 | Mandatory | |
| 13 | Advertiser CTA - link to a webpage | | Mandatory | |
| 14 | Advertiser CTA - rich-media interstitial | | Optional | Link to webpage |
| 15 | Name of product being advertised | 0-20 characters | Optional | No text |
| 16 | Tagline (short pitch of product) | 0-40 characters | Optional | No text |
| 17 | Description (longer descriptive text) | 0-120 characters | Optional | No text |
| 18 | Event Type | 3 (positive, negative, neutral or Class A, B and C) | Mandatory | |

The electronic package of assets provided by the content provider can include a mechanism for identifying aspects of content items that correspond to a standard. For example, each content item of the electronic package of assets can be associated with an identifier, and the header file for the electronic package of assets may categorize information based on the identifier. In one implementation, each content item may be tagged with metadata indicating standards-related information. For example, a content item can be tagged (via metadata or the header file) with 6) scalable icon-light colored version and 18) event type—Class A.

In one implementation, the data processing system 120 can automatically incorporate the electronic package of assets into an application. For example, the data processing system 120 can receive an application complying with a first standard from the application provider 115. The data processing system 120 can also receive an electronic package of assets complying with a second standard from a content provider 125. The data processing system 120 can determine that the second standard of the electronic package of assets substantially complies with the first standard of the application by determining that the electronic package complies with all mandatory rules of the standard. Thereafter, the data processing system 120 can automatically incorporate the electronic package of assets into the application by replacing the placeholders of the application with the corresponding content items of the electronic package of assets.

In some implementations, the data processing system 120 incorporates the electronic package of assets into the application, and provides the incorporated application to a user device 110. In other implementations, the data processing system 120 can provide the electronic package of assets to the application executing on the user device 110. The data processing system 120 can provide a first or subsequent electronic package of assets to the application executing on the user device 110 based on a time interval or responsive to a request for an electronic package of assets from the application or user device 110. For example, the application executing on the user device 110 may include a first electronic package of assets. The data processing system 120 may determine that the electronic package of assets expires after a certain time interval set by, e.g., the content provider 125, application provider 115, or another entity. Upon determining that the electronic package of assets has expired, the data processing system 120 can identify a second electronic package of assets that substantially complies with the standard associated with the application, and provide the second electronic package of assets to the user device 110. The content items of the second electronic package of assets can replace corresponding content items of the first electronic package of assets without the user device 110 having to re-download the application, but rather retrieve the electronic package of assets that includes a plurality of standardized content items and associated metadata.

In some implementations, the electronic package of assets includes functionality of the data processing system 120 such as the content placement module 130, event identification module 135 and database 140. For example, the electronic package of assets can receive an indication of an event of the application (e.g., event_type=A) corresponding to a placeholder associated with a rule (e.g., scalable_icon=20×120), select a content item that complies with the event type and rule, and update/replace the placeholder with the selected content.

In another implementation, the application can include an application programming interface ("API") that includes a protocol intended to be used as an interface by software components to communicate with each other. The API of the application can be designed to communicate an event or other information to the electronic package of assets to facilitate identifying or providing content to place in a placeholder of the application.

In yet another implementation, the application or electronic package of assets can be designed and configured to include a hooking component that receives or intercepts an indication of an event and provides an indication of the event to the electronic package of assets to facilitate identifying or providing content to place in a placeholder of the application. In some implementations, the hooking component can interpret the indication of the event to determine whether to replace the placeholder with a second content, or whether the electronic package of assets includes a second content corresponding to the identified event. For example, if the hooking component determines that the placeholders should be updated with second content, the hooking component can accordingly communicate this to the electronic package of assets. In another example, if the hooking component further determines that the electronic package of assets includes the second content, then the hooking component can accordingly communicate this to the electronic package of assets.

Figure 2A:
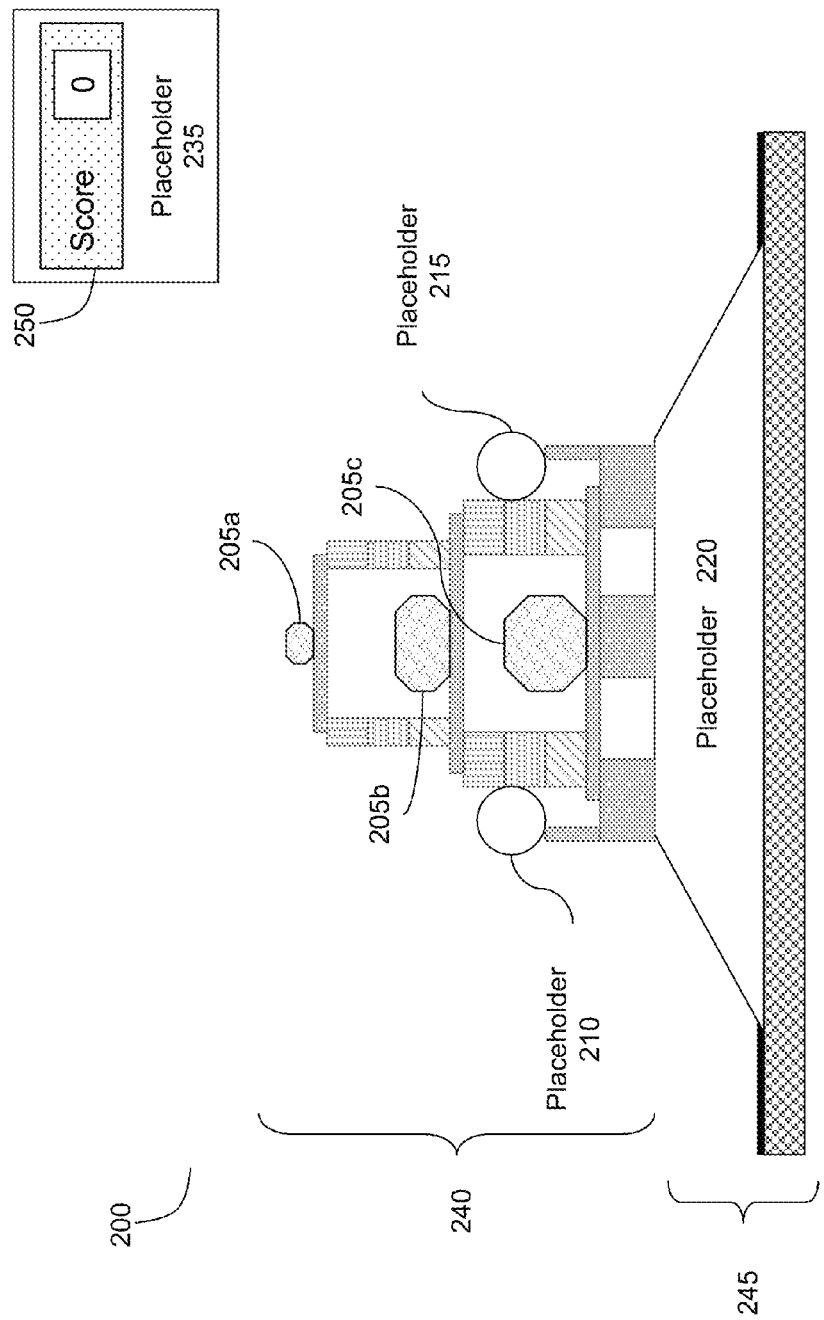
FIG. 2A shows an illustration of an example application with placeholders to be skinned.
Figure 2B:
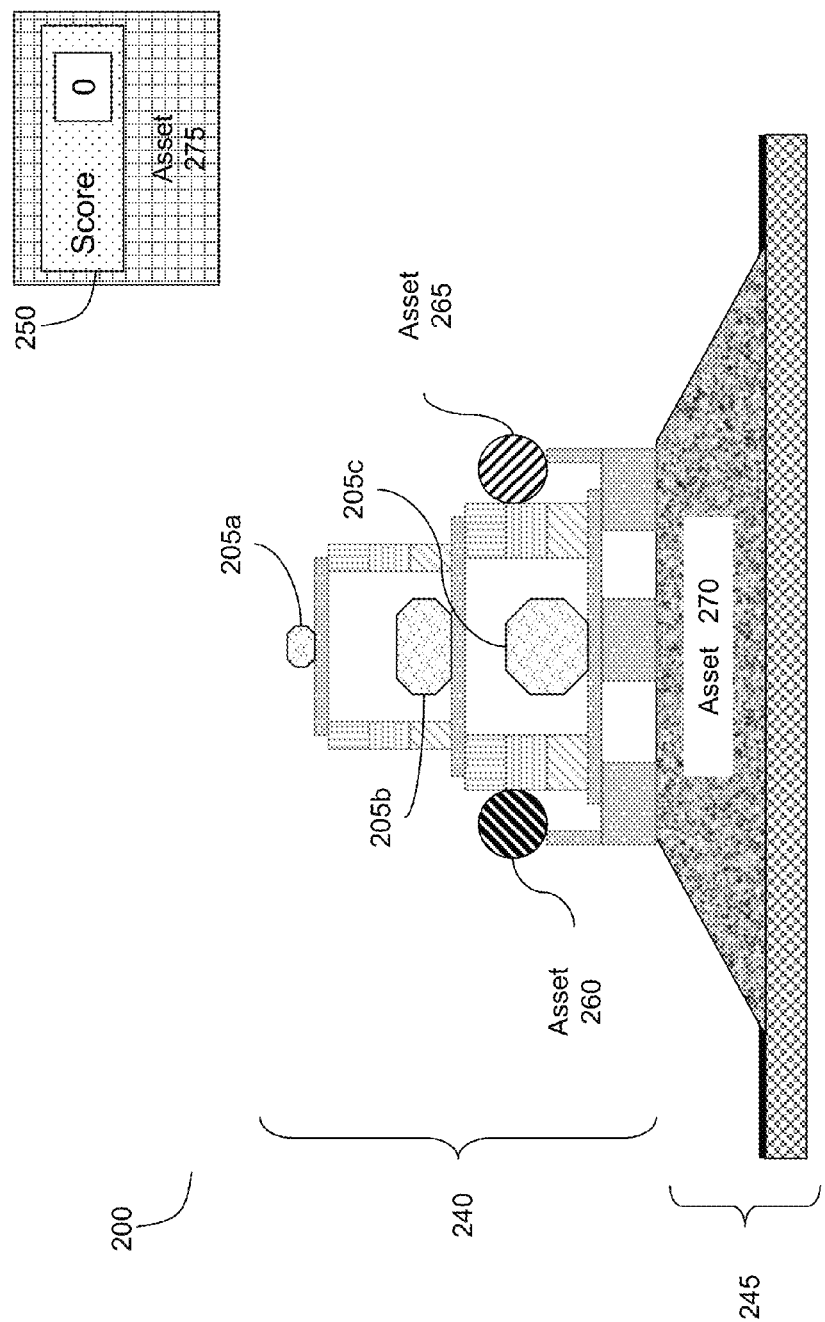
FIG. 2B shows an illustration of an example application skinned with interactive content in accordance with an implementation.
Figure 2C:
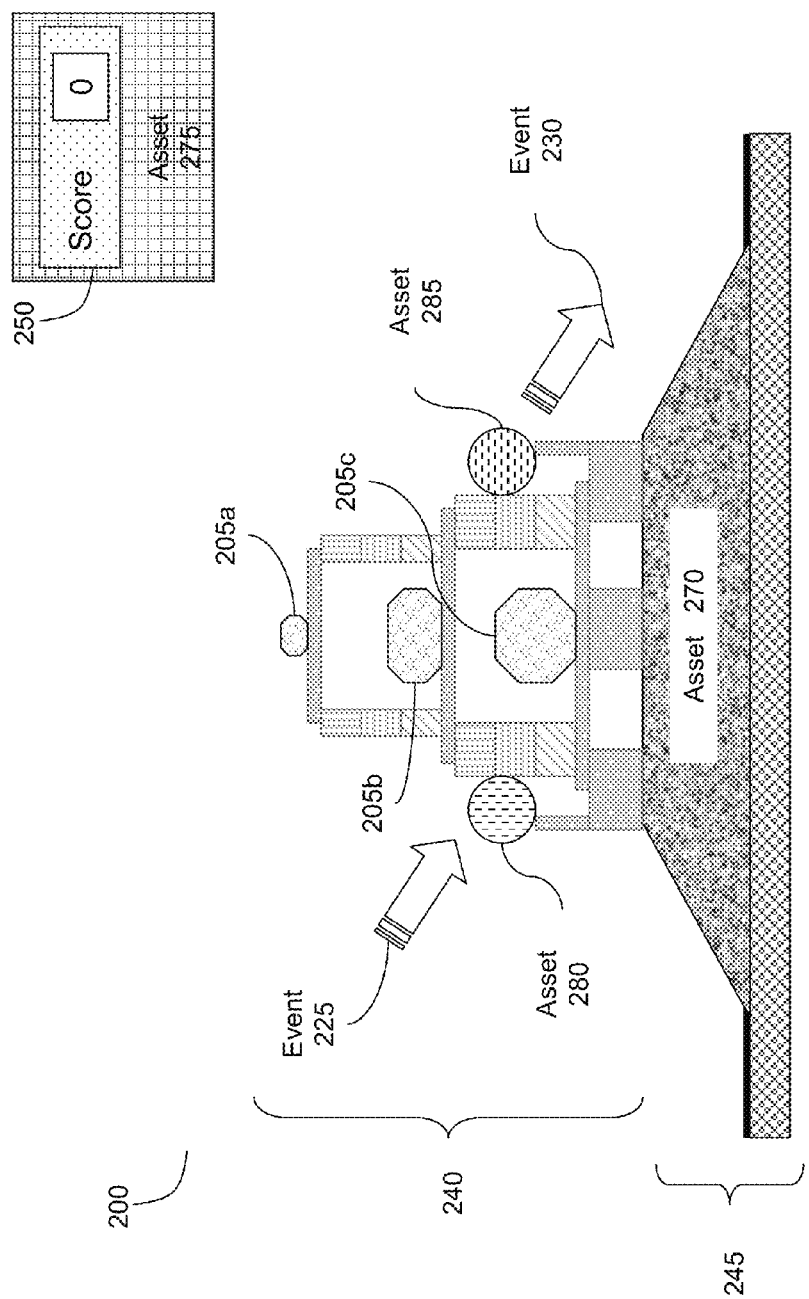
FIG. 2C shows an illustration of an example skinned application that is updated/modified responsive to an event in accordance with an implementation.

Referring to FIGS. 2A, 2B and 2C an illustration of an example application with placeholders to be skinned (e.g., before the application is skinned), an illustration of an example application skinned with interactive content, and an illustration of an example skinned application that is updated/modified response to an event, respectively, in accordance with an implementation are shown. In brief overview, the application can include a game 200. The game 200 can include a plurality of movable game elements 240 and a plurality of non-movable game elements 245 that are part of the foundation or scenery of the game 200. The application 200 can include characters 205a-c placed directly or indirectly on various game elements 240 or 245. The application 200 can include a scoreboard 250. The application 200 can also include a plurality of placeholders 210, 215, 220 and 235 for assets of an electronic package of assets. Prior to incorporation of the electronic package of assets, the placeholders may not include a content item, or include a blank content item. After incorporation of the electronic package of assets (as shown in FIG. 2B), placeholder 210, placeholder 215, placeholder 220 and placeholder 235 can include Asset 260, Asset 265, Asset 270 and Asset 275, respectively. In some implementations, the application 200 includes Event 225 and Event 230 (as shown in FIG. 2C) that may trigger the replacement or updating of a content item based on the standard, event type, or content items of the electronic package of assets.

Referring to FIG. 2A, and in further detail, the application provider 115 can design the application 200 to include a plurality of actionable or interactive elements 240 and non-actionable elements 245 such as a background, floor or foundation. Each element can include an image, content or be a vector-based design. In some implementations, the element can include a placeholder (e.g., 210, 215, 220 or 235) for a content item. The placeholder can comply with a standard and indicate one or more rules of the standard with which the placeholder complies. Based on some or all the standards or rules associated with the placeholders, the data processing system may identify a substantially complying electronic package of assets (e.g., an electronic package of assets that includes content items that complies with all mandatory rules of the standard).

For example, and referring to FIG. 2B, placeholder 220 may indicate that a complying content item includes a size 20×120, a dark color, and a product logo. In some implementations, the electronic package of assets may identify the standard for placeholder 220, identify a matching or substantially complying Asset 270 of the electronic package of assets, and replace the placeholder with Asset 270. In another implementation, the data processing system 120 may perform this incorporation prior to providing the application 200 to a user device 115. In yet another implementation, the application 200 may receive the electronic package of assets and be further designed and configured to identify the rule of the placeholder 220 and the complying Asset 270 of the electronic package of assets.

Referring to FIG. 2C, in some implementations elements 240 may interact directly or indirectly with events (e.g., 225 and 230) associated with the application 200 or events caused by a user of the user device 115. For example, a user playing game 200 may cause an Event 225 or Event 230 to occur. The user may cause the events to occur via a user interface of user device 115 (e.g., mouse click, keyboard, touch, gestures, moving device, accelerometer, or speech). In one implementation, the electronic package of assets may identify or receive an indication of an event type of Event 225. Upon identifying the event type, the electronic package of assets may select Asset 280 to replace Asset 260 of placeholder 210. For example, a user of user device 115 may trigger an event 225 that causes sphere 210 to move to the right, at least momentarily. The application 200 or electronic package of assets may be configured to identify this as an event type A (or a "good" event). In response to identifying the event type, Asset 260 may be replaced with Asset 280.

In some embodiments, a first placeholder and a second placeholder may include similar rules, and be replaced with similar assets. A first event may occur causing the asset of the first placeholder to be replaced with a first updated asset, while a second event may occur causing the asset of the second placeholder to be updated with a second updated asset. For example, placeholder 215 may include the same content item of placeholder 210, e.g., Asset 260 may be the same as Asset 265. However, upon identifying that an Event 230 has occurred, which may correspond to an event type "B" or a "bad" event, Asset 265, which corresponds to placeholder 215, may be replaced with Asset 285. Asset 285 may be similar to Asset 265 with respect to the size and color rules, but may differ with respect to the event type. Therefore, in this example, two placeholders originally included the same assets, but were each updated with different assets due to being associated with the occurrence of different events of different event types.

Figure 3:
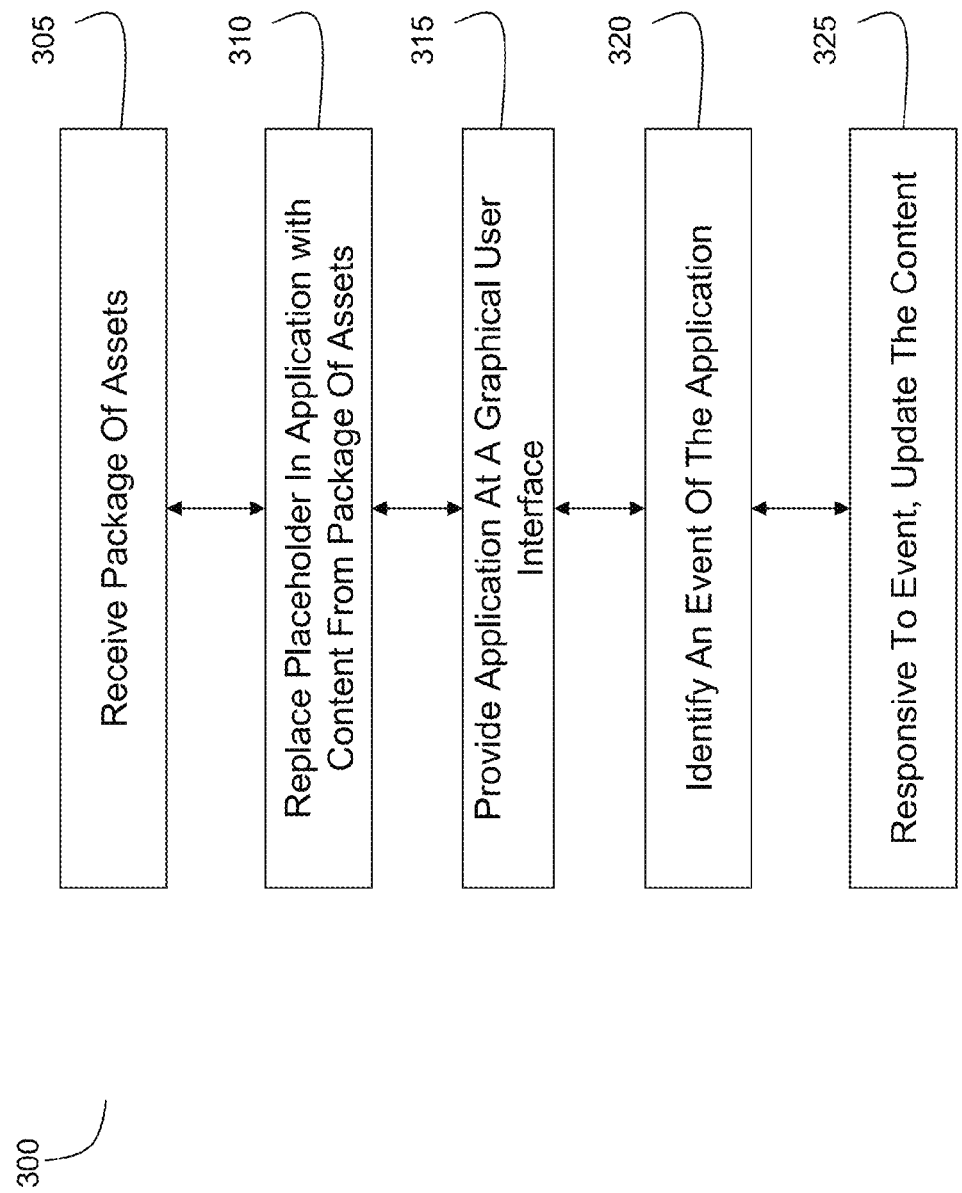
FIG. 3 is a flow chart illustrating an example method for skinning an application with interactive content in accordance with an implementation.

Referring to FIG. 3, a flow chart illustrating an example method for skinning an application with interactive content in accordance with an implementation is shown. In brief overview, the method 300 can include receiving an electronic package of assets 305. The method 300 can include replacing one or more placeholders in an application with content of the received electronic package of assets 310. The method 300 can include providing the application at a graphical user interface 315. The method 300 can include identifying an event of the application 320 and, responsive to identifying the event, updating the content 320.

Still referring to FIG. 3, and in further detail, the method 300 includes receiving an electronic package of assets 305. The electronic package of assets can be received from a content provider or a data processing system. In one implementation, a data processing system can receive an electronic package of assets from a content provider. In another implementation, a user device executing an application can receive an electronic package of assets. In yet another implementation, an application provider may receive an electronic package of assets.

In some implementations, the electronic package of assets can be received responsive to a request for an electronic package or a request for content. In other implementations, the electronic package can be received based on a time interval. For example, an electronic package can be received daily, weekly, monthly or based on another interval. In another implementation, an electronic package can be received in response to a condition. For example, a new electronic package of assets may be received if a user has launched an application with the same electronic package of assets more than a certain number of times; e.g., if the same content has been displayed on the display of a user device five times, the application or electronic package of assets may send a request for a new electronic package of assets.

In some implementations the request is received via an HTTP protocol, for example, as an HTTP GET command. In other implementations, the request may be a received via other protocols such as SOAP, LAN, or Ethernet protocols. In still other implementations, the electronic package of assets may be delivered directly using a proprietary protocol that communicates directly with a data processing system, application or user device. The request may directly identify the requested electronic package of assets or, in other implementations, the request may identify standards that require a specific electronic package of assets for display or processing. The request may also specifically identify the destination for the requested application.

For example, an electronic package of assets can comply or substantially comply with a standard. In some implementations, the request for the electronic package can include information to facilitate selecting an electronic package of assets for an application. For example, if an application makes a request for an electronic package of assets, the application can indicate, in the request, one or more standards with which the application complies. Based on the standard indicated in the request, a data processing system, content provider, or other entity can select or provide an electronic package of assets that complies with the standard in the request and provide the complying electronic package of assets to the requestor. An electronic package of assets can be in compliance with a requested standard by including a content item for each placeholder of an application, an additional content item for each event type, or by complying with other rules of the standard. In some implementations, the electronic package can include content from a single content provider, while in other implementations the electronic package of assets includes content from multiple content providers (e.g., advertisements for soda and chips).

The method 300 can include replacing at least one of a plurality of placeholders in an electronic application with content from the electronic package of assets 310. The method 300 includes replacing some or all the placeholders with corresponding content items of the electronic package of assets. The placeholders can identify rules of a standard, which can facilitate identifying content or the placeholder. In some implementations, the placeholders of the application can be replaced with content items prior to providing the application to a user device. For example, a data processing system, content provider or application provider can incorporate the electronic package of assets into the application. In some implementations, the application, executing on a user device, can receive the electronic package of assets and cause the placeholders of the application to be replaced or updated with content items of the electronic package of assets. In another implementation, the application can be designed with an electronic package of assets.

The method 300 can include providing the application at a graphical user interface 315. For example, the application can execute on a user device, server, or data processing system and provide output data to be displayed on a display device associated with a user device. A user may view or interact with an aspect of the application via a user interface of a user device.

The method 300 can include identifying an event of the electronic application 320. The event can be identified by the application, electronic package of assets, or other API or hooking component corresponding to the application, electronic package of assets, or the placeholder associated with the content item of the placeholder. For example, in a racing game, a hooking component can intercept an event associated with a car crash, interpret the car crash to be a "bad" event type, and communicate the identified event type to the electronic package of assets. In another example, an API of the application can directly communicate the event type to the electronic package of assets.

Responsive to the identification of the event, the method 300 can include updating the placeholder with a second content 325. For example, the electronic package of assets can select a content item that complies with one or more rules associated with a placeholder (e.g., a size and color of a banner into which the car crashed) and the event type (e.g., bad, event type B, crash, negative, or a numerical value). The electronic package of assets can then cause the placeholder to be replaced with the new content item.

In some implementations, the method 300 can include replacing some or all placeholders responsive to an event type or a condition. For example, after five car crashes, all placeholders of the application can be replaced with new content. In another example, after five car crashes, the application can request a new electronic package of assets from the data processing system or content provider, and upon receiving a second electronic package of assets, replace one or more placeholders with content of the second electronic package of assets.

In some implementations, the request for an electronic package can include information about the application that facilitates selecting an electronic package of assets. For example, a content provider may indicate that they want their content to displayed on sports games. Accordingly, if the request indicates that it is a request for content for a sports game, the data processing system can select an electronic package associated with sports (e.g., sports apparel advertisements) or otherwise directed to sports game.

In some implementations, an online auction is used to select an electronic package of assets for an application. For example, a data processing system can receive a plurality of electronic packages of assets from a plurality of content providers that can be provided in response to a request for content, where each electronic package of assets is associated with a bid (e.g., monetary bid, points, token, etc.). Responsive to the request for an electronic package, the data processing system may identify the electronic package of assets with the highest bid and provide that electronic package of assets to the requestor.

In another implementation, one or more content items of each of the plurality of electronic packages of assets can be associated with a bid. The data processing system can create a new electronic package of assets that includes content associated with the highest bid from the plurality of packages of assets, where the new electronic package of assets complies or substantially complies with a standard.

In some implementations, a content provider may be provided temporary or permanent exclusive rights to an application. For example, a content provider may be provided an opportunity to reserve a specific application, a specific set of applications, a specific type of application, a certain number of applications, or whole collections of applications exclusive of other content providers. In this manner, the content provider may assure that only its package(s) of assets is/are incorporated into the application(s) for delivery during the period of the reservation. A reservation may be for days or partial days, months or partial months, years or partial years, etc. A reservation may have a specific end date or time. A reservation may be for an indefinite time, with some event specifying the end of the reservation, for example, when a record goes platinum. A reservation may be a permanent transfer of rights in the application.

In some implementations, information about an application may be tracked. For example, number of impressions, length of impression, and triggering mechanism may be tracked. Such information may be used to encourage content providers to reserve the application.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 4:
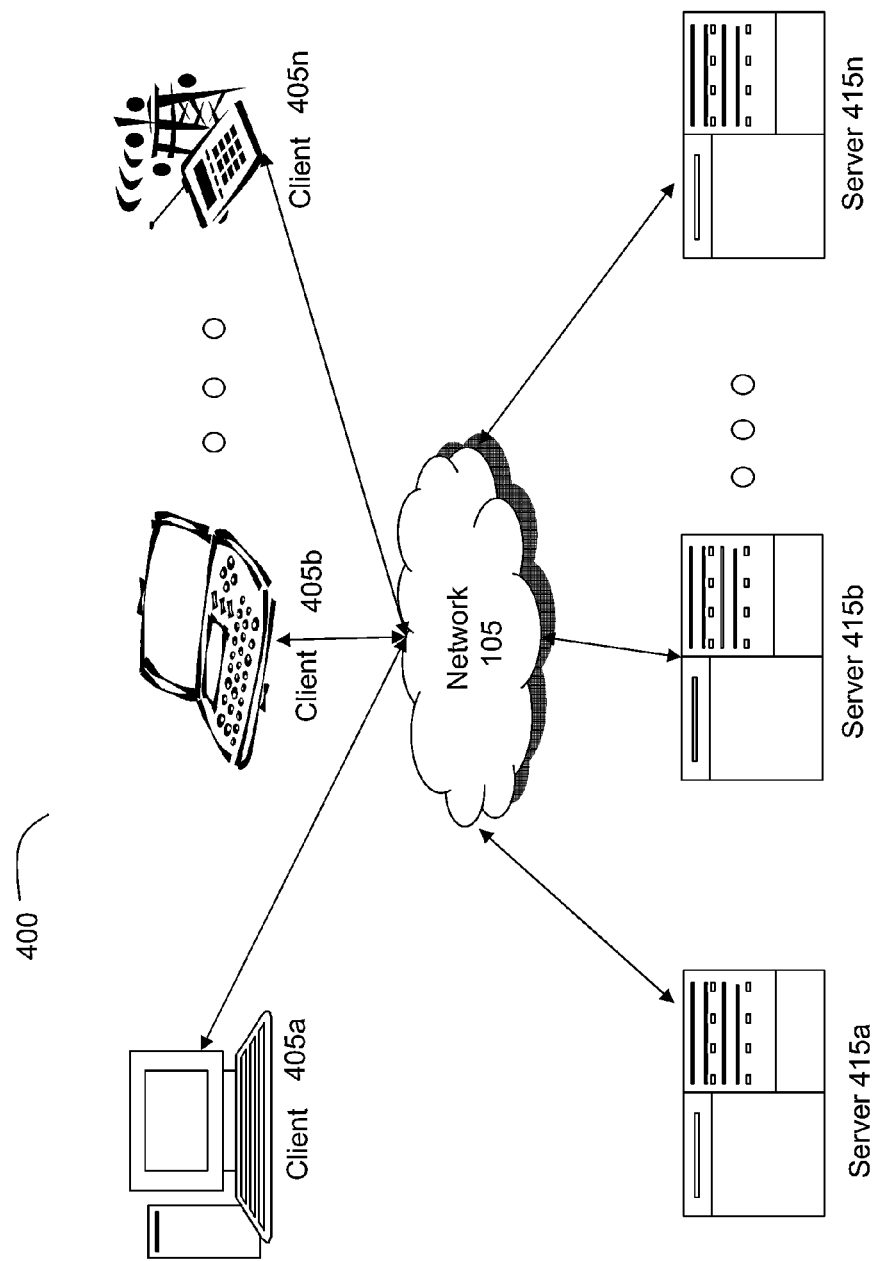
FIG. 4 shows an illustration of an example network environment comprising client machines in communication with remote machines in accordance with an implementation.

The system 100 and its components, such as a data processing system, may include hardware elements, such as one or more processors, logic devices, or circuits. FIG. 4 is an example implementation of a network environment 400. The system 100 and method 300 can operate in the network environment 400 depicted in FIG. 4. In brief overview, the network environment 400 includes one or more clients 405 that can be referred to as local machine(s) 405, client(s) 405, client node(s) 405, client machine(s) 405, client computer(s) 405, client device(s) 405, endpoint(s) 405, or endpoint node(s) 405) in communication with one or more servers 415 that can be referred to as server(s) 415, node 415, or remote machine(s) 415) via one or more networks 105. In some implementations, a client 405 has the capacity to function as both a client node seeking access to resources provided by a server and as a server providing access to hosted resources for other clients 405.

Although FIG. 4 shows a network 105 between the clients 405 and the servers 415, the clients 405 and the servers 415 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the clients 405 and the servers 415. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 415. In another of these implementations, the servers 415 may be geographically dispersed. In other implementations, server 415 may be administered as a single entity. The servers 415 can be heterogeneous; e.g., one or more of the servers 415 can operate according to one type of operating system platform.

In one implementation, servers 415 may be stored in high-density rack systems, along with associated storage systems, and located in an enterprise data center. In this implementation, consolidating the servers 415 in this way may improve system manageability, data security, the physical security of the system, and system performance by locating servers 415 and high performance storage systems on localized high performance networks. Centralizing the servers 415 and storage systems and coupling them with advanced system management tools allows more efficient use of server resources. Management of servers 415 may be de-centralized. For example, one or more servers 415 may comprise components, subsystems and circuits to support one or more management services.

The servers 415 may or may not be physically proximate to another server 415. Thus, the group of servers 415 logically grouped may be interconnected using a wide-area network (WAN) connection or a metropolitan-area network (MAN) connection. For example, servers 415 can be physically located in different continents or different regions of a continent, country, state, city, campus, or room. Data transmission speeds between servers 415 can be increased if the servers 415 are connected using a local-area network (LAN) connection or some form of direct connection.

Server 415 may include a file server, application server, web server, proxy server, appliance, network appliance, gateway, gateway, gateway server, virtualization server, deployment server, secure sockets layer virtual private network ("SSL VPN") server, or firewall. In one implementation, the server 415 may be referred to as a remote machine or a node.

The client 405 and server 415 may be deployed as or executed on any type and form of computing device, such as a computer, network device or appliance capable of communicating on any type and form of network and performing the operations described herein.

Figure 5:
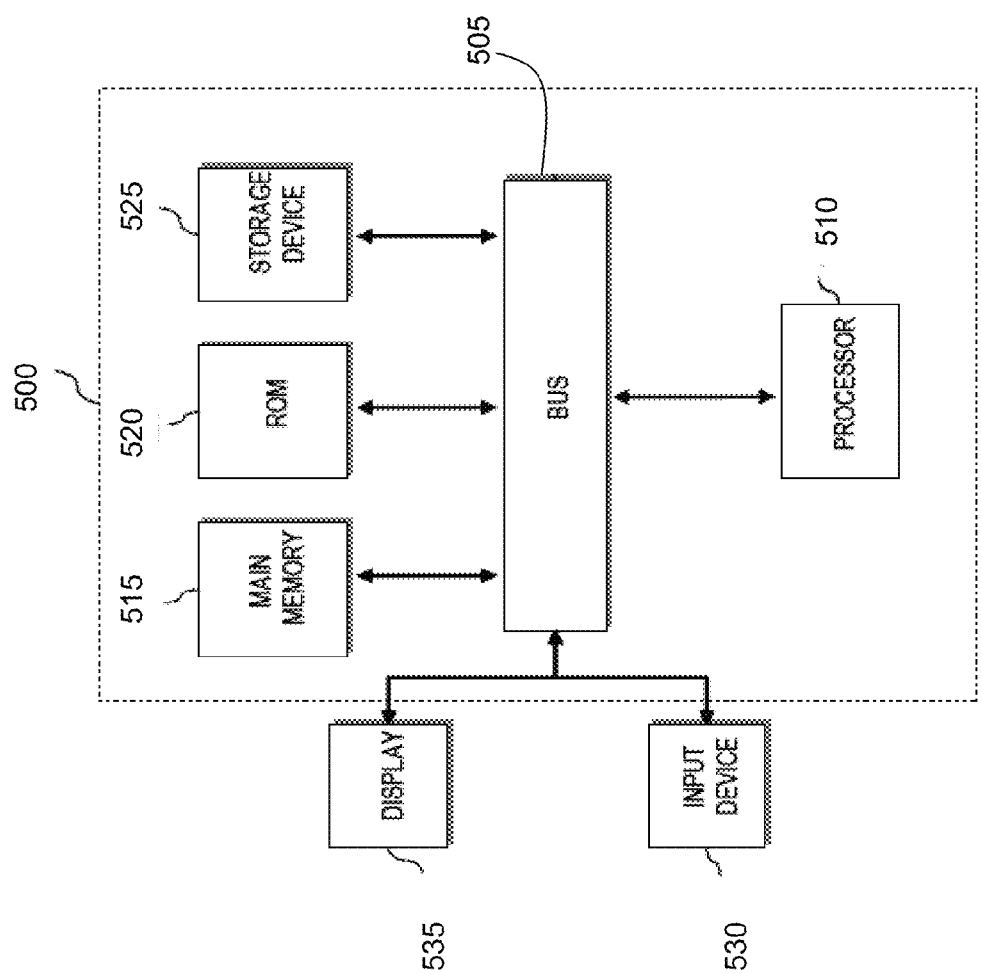
FIG. 5 is a block diagram illustrating a general architecture for a computer system that may be employed to implement various elements of the system shown in FIG. 1 and the method shown in FIG. 3.

FIG. 5 is a block diagram of a computer system 500 in accordance with an illustrative implementation. The computer system or computing device 500 can be used to implement the system 100, content provider 125, user device 110, application provider 115, data processing system 120, content placement module 130, event identification module 135, and database 140. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of skinning an application with content, comprising:

receiving, by a client device and over a data network, an electronic package of assets from a content provider, the electronic package of assets selected responsive to an online auction, the electronic package of assets comprising a first content item and a second content item, the electronic package of assets substantially complying with a standard, the standard defining one or more characteristics for the first content item and the second content item and defining an event type;

inserting, by the client device, in a placeholder of an electronic application executing on the client device, the first content item based on metadata in the electronic package of assets, the first content item associated with a first identifier of the metadata and the second content item associated with a second identifier of the metadata, the second identifier associated with the event type defined by the standard, the placeholder referencing the first identifier;

providing, by the client device, the electronic application at a graphical user interface of the client device and displaying the first content item;

executing, by the electronic application, one or more processes constituting an event of the electronic application;

identifying, by a hooking component of the electronic package of assets, that an event of the electronic application occurred during execution of the electronic application;

determining, by the hooking component, that the event of the electronic application corresponds to the event type; and replacing, by the client device responsive to the determination that the event of the electronic application corresponds to the event type, the first content item with the second content item based on the second identifier of the metadata.

2. The method of claim 1, wherein the first content item and the second content item are graphical images.

3. The method of claim 1, wherein the second content item of the electronic package of assets is tagged with the event type defined by the standard.

4. The method of claim 1, further comprising:
replacing the electronic package of assets with a new electronic package of assets based on a time interval; and
replacing the first content item with a content item of the new electronic package of assets.

5. The method of claim 1 wherein the content provider is a first content provider, wherein the first content item is provided by the first content provider and the second content item is provided by a second content provider.

6. The method of claim 1, wherein the electronic package of assets is a first electronic package of assets and the content provider is a first content provider, further comprising:
receiving a second electronic package of assets from a second content provider; and
replacing the first content item with a content item from the second electronic package of assets.

7. A system for skinning an application with content, comprising:
a data processing system configured to:
receive an electronic package of assets from a content provider over a data network, the electronic package of assets selected responsive to an online auction, the electronic package of assets comprising a first content item and a second content item, the electronic package of assets substantially complying with a standard, the standard defining one or more characteristics for the first content item and the second content item and defining an event type;
insert, in a placeholder of an electronic application executing on the data processing system, the first content item based on metadata of the electronic package of assets, the first content item associated with a first identifier of the metadata and the second content item associated with a second identifier of the metadata, the second identifier associated with the event type defined by the standard, the placeholder referencing the first identifier;
provide the electronic application at a graphical user interface of the data processing system and display the first content item;
execute one or more processes constituting an event of the electronic application;
identify, using a hooking component of the electronic package of assets, that an event of the electronic application occurred during execution of the electronic application;
determine that the event of the electronic application corresponds to the event type;
replace, responsive to the determination that the event of the electronic application corresponds to the event type, the first content item with the second content based item on the second identifier of the metadata.

8. The system of claim 7, wherein the first content item and the second content item are graphical images.

9. The system of claim 8, wherein the second content item of the electronic package of assets is tagged with the event type defined by the standard.

10. The system of claim 7, wherein the data processing system is further configured to:
replace the electronic package of assets with a new electronic package of assets based on a time interval; and
replace the first content item with a content item of the new electronic package of assets.

11. The system of claim 7, wherein the electronic package of assets is a first electronic package of assets and the content provider is a first content provider, and the data processing system is further configured to:
receive a second electronic package of assets from a second content provider; and
replace the first content item with a content item from the second electronic package of assets.

12. A non-transitory computer readable storage medium having instructions to skin an application with interactive content, the instructions comprising instructions to:
receive an electronic package of assets from a content provider over a data network, the electronic package of assets selected responsive to an online auction, the electronic package of assets comprising a first content item and a second content item, the electronic package of assets substantially complying with a standard, the standard defining one or more characteristics for the first content item and the second content item and defining an event type;
insert, in a placeholder of an electronic application executing on the data processing system, the first content item based on metadata of the electronic package of assets, the first content item associated with a first identifier of the metadata and the second content item associated with a second identifier of the metadata, the second identifier associated with the event type defined by the standard, the placeholder referencing the first identifier;
provide the electronic application at a graphical user interface of the data processing system and display the first content item;
execute one or more processes constituting an event of the electronic application;
identify, using a hooking component of the electronic package of assets, that an event of the electronic application occurred during execution of the electronic application;
determine that the event of the electronic application corresponds to the event type; and
replace, responsive to the determination that the event of the electronic application corresponds to the event type, the first content item with the second content item based on the second identifier of the metadata.

13. The non-transitory computer readable storage medium of claim 12, wherein first content item and the second content item are graphical images.

* * * * *